US011477202B2

(12) United States Patent
De Knijf et al.

(10) Patent No.: US 11,477,202 B2
(45) Date of Patent: Oct. 18, 2022

(54) SYSTEM AND METHOD FOR DETECTING UNKNOWN IOT DEVICE TYPES BY MONITORING THEIR BEHAVIOR

(71) Applicant: Avast Software s.r.o., Prague (CZ)

(72) Inventors: Jeroen De Knijf, Amsterdam (NL); David Makovsky, Deblin (CZ)

(73) Assignee: Avast Software s.r.o., Prague (CZ)

(*) Notice: Subject to any disclaimer, the term of this patent is extended or adjusted under 35 U.S.C. 154(b) by 0 days.

(21) Appl. No.: 15/857,433

(22) Filed: Dec. 28, 2017

(65) Prior Publication Data

US 2018/0191593 A1 Jul. 5, 2018

Related U.S. Application Data

(60) Provisional application No. 62/578,290, filed on Oct. 27, 2017, provisional application No. 62/578,336, (Continued)

(51) Int. Cl.
*H04L 9/40* (2022.01)
*G06F 16/20* (2019.01)
(Continued)

(52) U.S. Cl.
CPC ............ *H04L 63/102* (2013.01); *G06F 16/20* (2019.01); *G06F 21/52* (2013.01); *G06F 21/554* (2013.01); *G06F 21/56* (2013.01); *H04L 41/50* (2013.01); *H04L 43/0876* (2013.01); *H04L 63/104* (2013.01); *H04L 63/14* (2013.01);
(Continued)

(58) Field of Classification Search
CPC . H04L 63/1408; H04L 41/50; H04L 43/0876; H04L 63/1458; H04L 63/1425; H04L 41/069; H04L 43/00; H04L 43/12; H04L 63/1433; H04L 67/12; H04L 67/00; H04L 67/125; H04L 67/303;
(Continued)

(56) References Cited

U.S. PATENT DOCUMENTS 9,185,095 B1 11/2015 Moritz et al.
9,798,876 B1 10/2017 Parker-Wood et al.
(Continued)

OTHER PUBLICATIONS

Neumann et al., An empirical study of passive 802.11 Device Fingerprinting, 2012 32nd International Conference on Distributed Computing Systems Workshops, Jun. 2012, pp. 593-602, Institute of Electrical and Electronics Engineers.
(Continued)

*Primary Examiner* — Tan Doan
(74) *Attorney, Agent, or Firm* — Avek IP, LLC; William B. Kircher

(57) ABSTRACT

In order to identify an unknown IoT device type, behavioral or statistical data of the device is collected and analyzed. A functional group may be created using behavioral data of devices of a known type. A behavior profile for the functional group may be generated and stored in a database. The behavioral data of the device of an unknown type is compared to the behavior profile of the functional group. When the similarity of the behavioral data of the device of an unknown type and the behavior profile exceeds a predetermined or configurable threshold, a device type associated with the functional group can be assigned to the device of a previously unknown type.

19 Claims, 3 Drawing Sheets

Related U.S. Application Data filed on Oct. 27, 2017, provisional application No. 62/440,321, filed on Dec. 29, 2016, provisional application No. 62/440,361, filed on Dec. 29, 2016.

(51) Int. Cl.
| | | |
|---|---|---|
| *H04L 67/30* | (2022.01) | |
| *H04W 4/70* | (2018.01) | |
| *H04L 67/12* | (2022.01) | |
| *H04W 12/122* | (2021.01) | |
| *G06F 21/52* | (2013.01) | |
| *G06F 21/55* | (2013.01) | |
| *G06F 21/56* | (2013.01) | |
| *H04L 41/50* | (2022.01) | |
| *H04L 43/0876* | (2022.01) | |

(52) U.S. Cl.
CPC ...... *H04L 63/1408* (2013.01); *H04L 63/1458* (2013.01); *H04L 67/12* (2013.01); *H04L 67/30* (2013.01); *H04W 4/70* (2018.02); *H04W 12/122* (2021.01)

(58) Field of Classification Search
CPC ... H04L 63/102; H04L 63/0245; H04L 63/08; G06F 16/20; G06F 21/52; G06F 21/554; G06F 21/56
USPC .......................................................... 709/224
See application file for complete search history.

(56) References Cited

U.S. PATENT DOCUMENTS

| | | |
|---|---|---|
| 9,961,574 B1 | 5/2018 | Tubi et al. |
| 2005/0086500 A1 | 4/2005 | Albornoz |
| 2013/0097701 A1 | 4/2013 | Moyle et al. |
| 2013/0139263 A1* | 5/2013 | Beyah ................ H04L 63/1408 |
| | | 726/23 |
| 2014/0143873 A1 | 5/2014 | Stirtzinger et al. |
| 2015/0019714 A1 | 1/2015 | Shaashua et al. |
| 2015/0199610 A1 | 7/2015 | Hershberg |
| 2016/0212099 A1* | 7/2016 | Zou .................... H04L 63/0263 |
| 2016/0234205 A1 | 8/2016 | An et al. |
| 2016/0234232 A1* | 8/2016 | Poder ................. H04L 63/1408 |
| 2016/0269436 A1 | 9/2016 | Danielson et al. |
| 2016/0283854 A1* | 9/2016 | Lee ....................... G06N 7/005 |
| 2017/0024660 A1 | 1/2017 | Chen et al. |
| 2017/0142119 A1 | 5/2017 | Zhang |
| 2017/0265053 A1* | 9/2017 | Diebold ................ H04W 76/14 |

OTHER PUBLICATIONS

Uluagac et al., A Passive Technique for Fingerprinting Wireless Devices with Wired-side Observations, 2013 IEEE Conference on Communications and Network Security (CNS), Oct. 2013, pp. 305-313, Institute of Electrical and Electronics Engineers.

Uluagac, A. Selcuk, A Passive Technique for Fingerprinting Wireless Devices with Wired-side Observations, 2013 IEEE Conference on Communications and Network Security (CNS), 2013, pp. 305-313, IEEE.

* cited by examiner

SYSTEM AND METHOD FOR DETECTING UNKNOWN IOT DEVICE TYPES BY MONITORING THEIR BEHAVIOR

CROSS-REFERENCE TO RELATED APPLICATIONS

This application claims priority to U.S. Provisional Application No. 62/440,321 entitled "Detecting Unknown IoT Device Types by Monitoring Their Behavior," filed Dec. 29, 2016, U.S. Provisional Application No. 62/440,361 entitled "Detecting Malicious IoT Devices by Monitoring Behavior" filed Dec. 29, 2016, U.S. Provisional Application No. 62/578,290 entitled "Detecting Unknown IoT Device Types by Monitoring Their Behavior" filed Oct. 27, 2017, and U.S. Provisional Application No. 62/578,336 entitled "Detecting Malicious IoT Devices by Monitoring Behavior" filed Oct. 27, 2017. All of the above-referenced applications, the entire disclosures of which, including the specifications and drawings, are incorporated herein by reference.

FIELD OF THE INVENTION

The present invention relates generally to a system and method for detecting or determining unknown device types on a network, and more particularly, monitoring a device's behavior to determine a type for the device.

BACKGROUND OF THE INVENTION

The Internet of Things ("IoT") is a term used to describe a network comprising many different types of devices, both traditional computers and devices that in the past were not capable of network communication. A "thing" in the IoT can be any type of device that can collect data and communicate data via a network. Examples of such devices can include smart home appliances, thermostats, sensors, biochips, implantable medical devices, monitoring devices, vehicle-based devices, or anything that communicates data over an Internet connection. An IoT device can provide for control and automation of devices in a smart home, a smart grid, a smart factory, a smart city, an intelligent transportation system, and other environments where IoT devices are present. In environments that include IoT devices, objects may be sensed and controlled remotely across a network infrastructure. When the IoT devices are of an unknown device type, a need exists for identifying the IoT devices and associating them with a functional group of devices.

SUMMARY OF THE INVENTION

The present invention relates generally to a system and method for determining unknown device types using a comparative analysis. In order to identify an unknown IoT device type, statistical data of the device may be compared against a behavior profile of a functional group that includes devices of known types.

One aspect of the present invention is directed to a method, wherein the method is carried out by a system that includes one or more devices connected through a network. The method can include the steps of collecting behavior data or statistical patterns of known devices and creating at least one functional group of devices that perform the same task. The statistical patterns may include, for example, device type, brand name of manufacturer, MAC address, and model information. A behavior profile for the functional group may be created and stored in a behavior database that is coupled to the internet. The behavior profile for the functional group may be created using known device behavior data obtained by one or more of user input, detection, or input from third parties. One or more data streams from one or more devices having an unknown device type that are connected to one or more local networks may be collected and received by the system. The data streams of the devices of unknown device types can include, for example, one or more of a statistical amount of inbound or outbound network traffic, a type of network traffic, a source and destination port of a packet, a destination address of the packet, time between the packet arrival and transmission, a duration of a connection, and the like. The data streams for the one or more first devices may be transmitted from one or more routers or monitor nodes to a behavior analyzer. The routers, monitor nodes and behavior analyzer may be connected to the internet. From the data streams, behavioral data can be determined. In a subsequent step, a similarity between the behavioral data of the one or more devices having unknown device types and the behavior profile of at least one functional group can be determined. In one embodiment, a similarity score may be generated. In response to determining that the similarity of the behavioral data of the devices and the behavior profile of a functional group meets or exceeds a predetermined or configurable threshold, a device type associated with the functional group may be assigned to the device.

Another aspect of the present invention is directed to a system for determining a device type of an unknown device, such as an IoT device. The system may include one or more computing devices configured for executing an executable program thereon, wherein multiple computing devices can be connected through a local network and/or the internet. One or more devices of an unknown device type may be associated with one or more monitor nodes. The monitor nodes may each include a data stream monitor and device statistics. The data stream monitor can determine various statistics from the data streams. The device statistic can include various combinations of one or more of statistical amount of inbound or outbound network traffic, a type of network traffic, a source and destination port of a packet, destination address of the packet, time between the packet arrival and transmission, a duration of a connection, and the like. The monitor nodes may transmit the data streams from the devices to a router or computing device. The router may be provided to execute the transmission of a data stream of the devices between a local network and the internet. The system can further comprise a behavior analyzer configured to receive the data stream of the devices, compare behavioral data of the data stream of the devices with a behavior profile of at least one functional group and, based on the comparison, assign a device type associated with the at least one functional group to the devices.

A further aspect of the present invention is directed to a non-transitory computer readable storage medium having a program stored thereon that is configured to perform the method as generally described above.

BRIEF DESCRIPTION OF THE DRAWINGS

For a better understanding of the inventive subject matter, reference may be made to the accompanying drawings in which.

DETAILED DESCRIPTION

Figure 1:
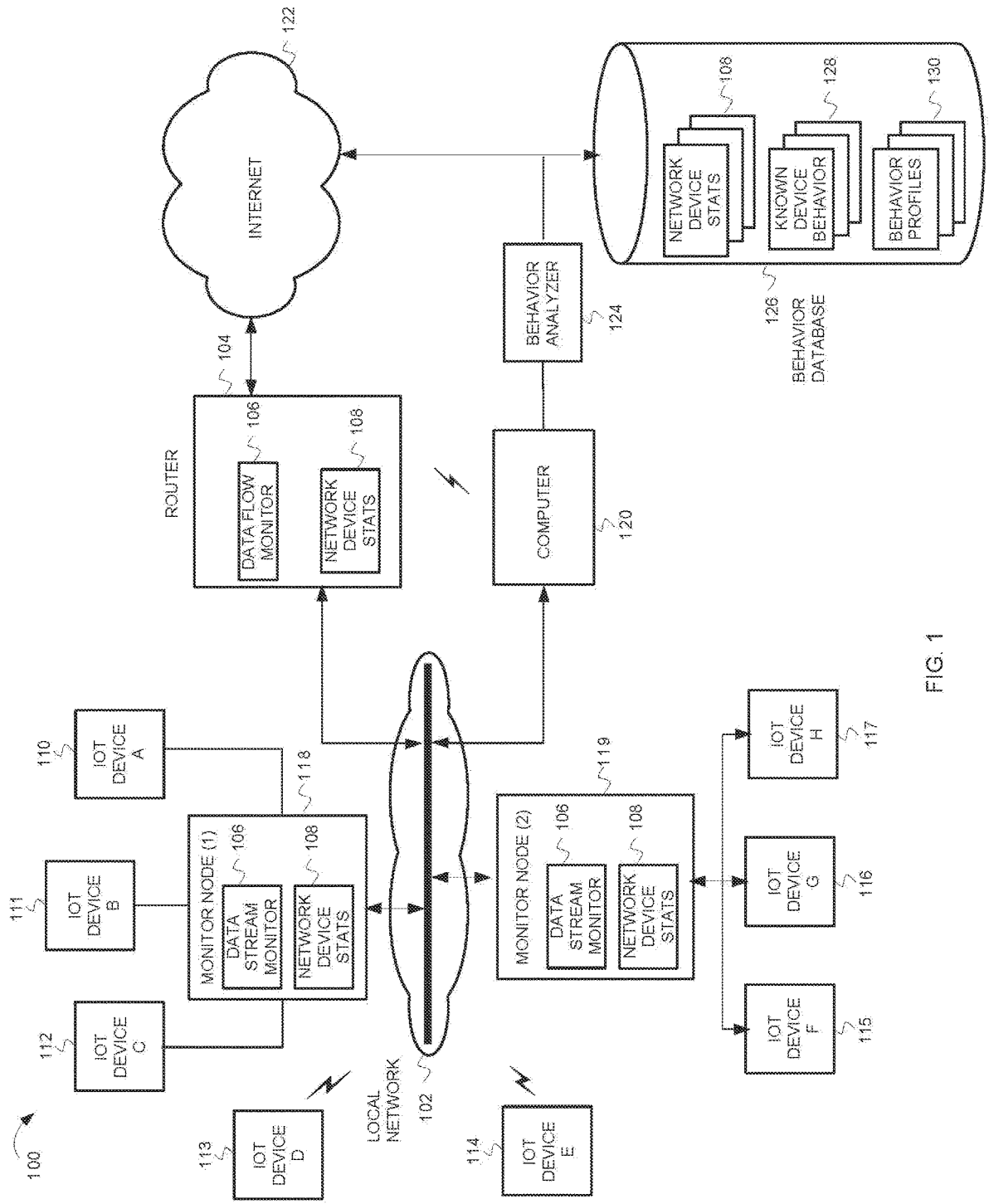
FIG. 1 is a block diagram illustrating a system for detecting an unknown IoT device type using a behavior analysis in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Nom Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating a system for determining an unknown IoT device type using similarity analysis in accordance with one embodiment of the present invention. In some aspects, system 100 can include a local network 102, a router 104, IoT devices 110-117, a computer 120, monitor nodes 118-119, internet 122, a behavior analyzer 124, and a behavior database 126.

Local network 102 can be a wired network, a wireless network, or any combination thereof. Any of the wired or wireless networks may be a home network, local area network (LAN), metropolitan area network (MAN), wide area network (WAN), or corporate intranet, for example. Similarly, internet 122 can be any collection of one or more wired networks, wireless networks, or combinations of the two that cover a greater domain than local network 102. In some aspects, internet 122 can be one or more networks that make up the Internet.

An IoT device (e.g., IoT devices 110-117) can be any type of device that can collect data, receive commands, and communicate data via local network 102 and/or internet 122. Examples of such devices include, but are not limited to smart home appliances, thermostats, sensors, biochips, office devices, implantable medical devices, monitoring devices, vehicle-based devices, or other devices that communicate data over a local network 102 and/or internet 122 connection.

Computer 120 can be a server computer, a desktop computer, a laptop computer, a tablet computer, a smart phone, a set-top box, or any other device having one or more processors and memories enabling the device to execute programs. The embodiments are not limited to any particular type of computing device. The computing device can include a user client device (not shown) that may be operated by a user. The computer unit 120 can include one or more of software programs, apps, or other programmable logic that can be configured to compare one or more files with one or more other files.

Router 104 can forward network data between local network 102 and internet 122. Router 104 can be a stand-alone router, a wireless router or access point, a modem/router or any other device that forwards data between local network 102 and internet 122. In some aspects of the disclosure, router 104 can include a data stream monitor 106. Data stream monitor 106 can capture the data flow of devices in the local network 102 such as IoT devices 110-117, monitor nodes 118-119, computer 120, and any other devices on local network 102. In one embodiment, monitor nodes 118-119 can be IoT hubs (not shown) that transfer or control network connected IoT devices. Monitor nodes 118-119 can each include a data stream monitor 106. Data stream monitor 106 can determine various statistics from the data stream such as network device statistics 108. In some aspects, network device statistics 108 can include various combinations of one or more of:

The amount of inbound/outbound traffic per device per minute.
Type of traffic.
Source and destination port of a packet.
Destination address of a packet.
Duration of the connection.
Time between the packets.

Network device statistics 108 can be maintained on a per device basis.

Monitor nodes 118-119 can each be a computing device similar to computer 120. Monitor nodes 118-119 can execute the data stream monitor 106 to generate network device statistics 108 instead of, or in addition to, router 104. For example, monitor nodes 118-119 can execute a network sniffer program that captures packets from network 102.

Network device statistics 108 can be transmitted from router 104 or computer 120 to behavior analyzer 124 via internet 122. Behavior analyzer 124 can store the network device statistics 108 in behavior database 126. In addition to network device statistics 108, behavior database 126 can include known device behaviors 128 and/or behavior profiles 130. Known device behaviors 128 include data regarding known IoT devices. Known devices can be identified by user input, detected based detection methods, including methods disclosed herein or other detection methods, or obtained by acquiring data from third parties. Other detection methods include using available services running on the device to categorize it, or using the response banner of the device to do the categorization, among other suitable methods.

Behavior profiles 130 can also be maintained in behavior database 126. Behavior profiles 130 comprise data regarding the usual behavior of devices, or devices belonging to a particular group of devices.

Behavior analyzer 124 can use the network device statistics 108, known device behavior 128, and behavior profiles 130 to determine a device type for an unknown IoT device as further described below with respect to FIG. 2.

It should be noted that although only one local network 102 is illustrated in FIG. 1, behavior analyzer 124 can receive network device statistics 108 from many different connections, user client devices (not shown), and local networks 102.

Figure 2:
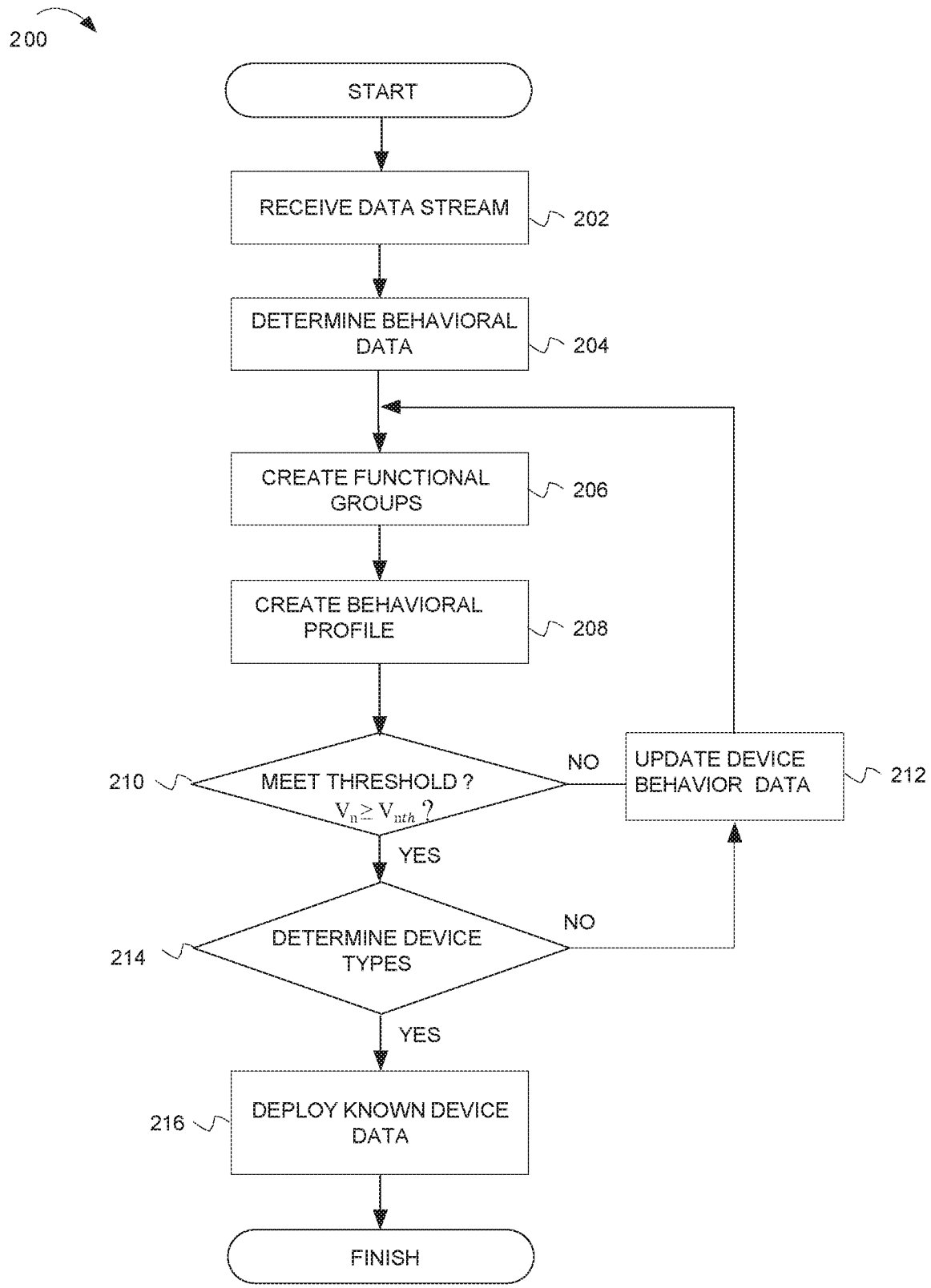
FIG. 2 is a flow chart illustrating operations of a method for determining an unknown IoT device in accordance with one embodiment of the present invention.

FIG. 2 is a flow chart illustrating operations of a method for detecting a device type for an unknown IoT device in accordance with one embodiment of the present invention. The method can begin at block 202 by receiving a data stream of network device statistics 108 through local the network 102 or the internet 122. The network device statistics 108 can be received from multiple networks within the local network 102.

At block 204, known and unknown device types are determined using the assistance of the behavior database 126 or already known techniques. Also with previously determined statistical patterns (as previously determined by block 210 in a previous iteration of the method 200), the device type, brand, and/or model are determined if the behavioral data satisfy the statistical constraints.

At block 206, known IoT devices are grouped into functional groups. With assistance of a knowledge database and/or known available techniques, devices that can be determined may be separated from still unknown devices. Previously considered statistical patterns such as, types of device, brand name of manufacturer, MAC address, model information may be determined. In some aspect, a functional group is a group that performs the same task. For example, one such group can be IP-cameras (of different vendors, with different operating systems). Another group can be media players such as smart speaker systems, smart televisions, and the like. A further group can be game consoles. Those of skill in the art will appreciate that many other groups can exist and such groups are within the scope of the inventive subject matter. A device can be a member of more than one group. For example, a Microsoft Xbox can both belong to the game consoles group as well as to the media player group. Furthermore, a group can have subgroups that can represent multiple granularity layers. For example, IP-cameras can be further divided into subgroups comprising outdoor cameras and indoor cameras.

At block 208, a behavioral profile can be created for the identified groups and subgroups. The behavioral profile can include data that describes the usual behavior of devices that belong to the identified groups and subgroups. In particular, for every group and/or subgroup, the normal behavior can be estimated based upon the behavioral data for that group or subgroup. That is, for every group or subgroup, statistical patterns can be derived that uses the different types of data available in the behavior database 126. Such a pattern would capture (with statistical bounds) the normal behavior for the group or subgroup, and the data element. An example of such a pattern could be: with a certainty of 99%, the minimal duration for this device group is at least 1 second, while the maximum duration is lower than 7 seconds. However, patterns that combine different data elements are possible, for example: when the duration of the connection is longer than 10 seconds, the amount of incoming traffic is at least five times the amount of outgoing traffic.

It should be noted that this learning process is a continuous process. That is, it is very likely that the behavior of devices will change over time and that new types of IoT devices will arise. As such, it is desirable to update the behavior database 126 regularly in order to update the estimates for normal behavior.

At block 210, the behavior data can be represented as a reference bound. The reference bound can be set as threshold values that have acceptable ranges (or limits) of every functional group. For example, if the behavior data of the unknown device (e.g., IP camera Vn=8.3) is generated as a value of 8.3 and a previously determined behavior data of a known device (e.g., IP camera Vnth=7.5) requires a value of 7.5 or more, then the system 100 can assign the IP camera-Vn to belong the IP camera-Vnth group. But if the unknown device behavior data does not meet any functional group threshold value, then the unknown device could be assigned a new functional group. In one embodiment, a similarity score can be generated by analyzing a combination of the various IoT device statistics. When a certain value of the device meets a predetermined threshold value, then the device may be marked as belonging to that device type, brand name of the manufacturer, MAC address, and/or device model number.

At block 212, the behavior database can be updated with the newly discovered device types and statistical patterns determined at block 210. A normal behavior of the unknown device can be estimated based on the behavioral data derived from statistical patterns. The type of unknown device can be determined by comparing the behavioral data with threshold values. In one embodiment, a similarity score can be generated by analyzing a combination of the various IoT device statistics.

At block 214, device types can be determined for unknown devices having unknown types. For every unknown device, it can be determined how likely it is that the unknown device belongs to a certain profile. That is, the behavioral data of the device derived from its network device statistics 108 is matched against the earlier derived patterns as described above. In some aspects, for every subgroup, a similarity score is obtained that reflects that likelihood that the device belongs to that subgroup. The similarity score can be a weighted combination of the various network device statistics 108, or a vector formed from the network device statistics. These similarity scores are then combined in order to determine the device type. In some aspects, the behavioral data for unknown devices can be matched against statistical patterns for known device types. If the similarity score exceeds a predetermined or configurable threshold, then the device can be marked as belonging to the matching device type, and optionally, the brand and/or model of the device.

At block 216, the device type, and optionally brand and model of the previously unknown devices, can be updated when the categorization confidence exceeds a predetermined or configurable threshold. Newly updated unknown IoT devices can be assigned to a known device functional group database. The known device type data can be deployed to the local network 102. The updated new IoT device data can be stored in behavior database 128, which can be configured by the user client device.

Figure 3:
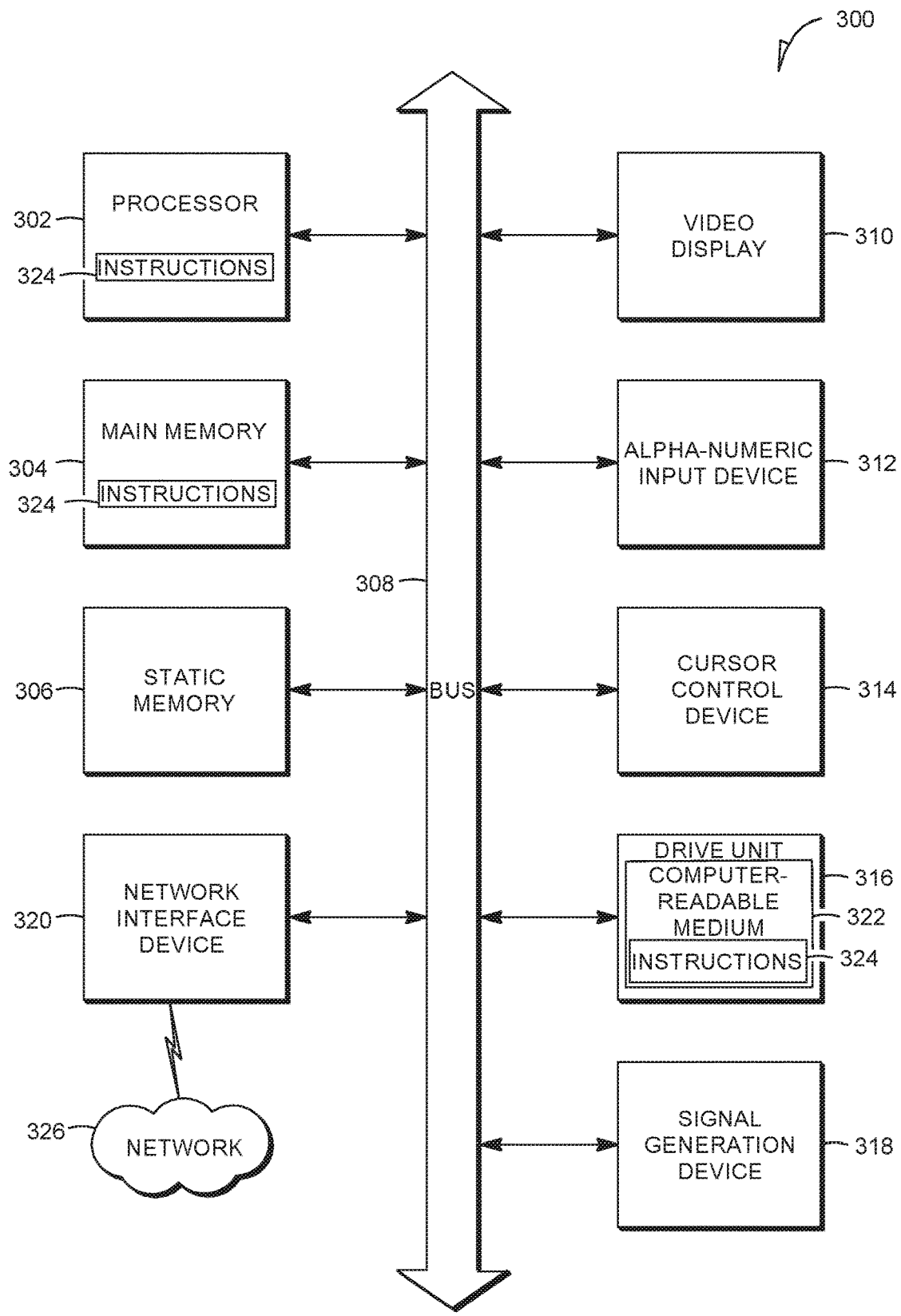
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system 100 as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for determining a device type, the computer-implemented method comprising the steps of:
   receiving at least one data stream for one or more first devices having an unknown device type connected to one or more local networks;
   creating at least one functional group from behavioral data of second devices having a known device type, wherein each of the second devices performs a same task as the other second devices in the functional group;
   creating a behavior profile for the at least one functional group, wherein the behavior profile includes behavioral data describing statistical patterns of behavior of the second devices, wherein the behavioral data describing statistical patterns of behaviors is obtained by user input, detection, and input from third parties;
   determining behavioral data from the at least one data stream for the one or more first devices, wherein the behavioral data for the at least one data stream for the one or more first devices includes a time between the packet arrival and transmission and a duration of a connection;
   determining a similarity between the behavioral data of the one or more first devices and the behavioral data of the behavior profile of the at least one functional group; and
   in response to determining that the similarity exceeds a predetermined or configurable threshold, assigning the known device type associated with the at least one functional group to the one or more first devices.

2. The computer-implemented method of claim 1, wherein the at least one data stream for the one or more first devices further includes one or more of: a statistical amount of inbound or outbound network traffic, a type of network traffic, a source and destination port of a packet, and a destination address of the packet.

3. The computer-implemented method of claim 1, further comprising the step of deploying known device type data to the one or more local networks.

4. The computer-implemented method of claim 1, wherein the at least one data stream for the one or more first devices is transmitted from one or more routers or monitor nodes to a behavior analyzer.

5. The computer-implemented method of claim 4, wherein the one or more routers or monitor nodes are coupled to an internet, and wherein the internet is coupled to the behavior analyzer.

6. The computer-implemented method of claim 4, wherein the behavior analyzer is coupled to a behavior database having known device behavior data.

7. The computer-implemented method of claim 1, wherein the behavioral data includes one or more threshold values having acceptable ranges of the at least one functional group.

8. A system for determining an unknown Internet of Things (IoT) device type, the system comprising:
   a computing device to execute an executable program;
   one or more devices associated with one or more monitor nodes;
   one or more routers to execute transmission of a data stream of the one or more first devices between a local network and an internet; and
   a behavior analyzer configured to:
   receive the data stream of the one or more first devices having an unknown device type connected to the local network,
   create at least one functional group from behavioral data of second devices having a known device type, wherein each of the second devices performs a same task as the other second devices in the functional group,
   create a behavior profile for the at least one functional group, wherein the behavior profile includes behavioral data describing statistical patterns of behaviors of the second devices, wherein the behavioral data describing statistical patterns of behaviors is obtained by user input, detection, and input from third parties,
   determine behavioral data from the data stream for the one or more first devices, wherein the behavioral data for the at least one data stream for the one or more first devices includes a time between the packet arrival and transmission and a duration of a connection,
   determine a similarity between the behavioral data of the one or more first devices and the behavioral data of the behavior profile of the at least one functional group, and
   in response to determining that the similarity exceeds a predetermined or configurable threshold, assign the known device type associated with the at least one functional group to the one or more first devices.

9. The system of claim 8, wherein the computing device includes one or more processors, a network interface module, and memory, and wherein the processor is coupled to the network interface module and is configured to execute a behavior tracking process.

10. The system of claim 8, wherein the behavior analyzer is coupled to a behavior database having the behavior profile and known device behavior data.

11. The system of claim 8, wherein the one or more monitor nodes include a data stream monitor and device statistics.

12. The system of claim 8, wherein the data stream of the one or more devices further includes one or more of: a statistical amount of inbound or outbound network traffic, a type of network traffic, a source and destination port of a packet, and a destination address of the packet.

13. The system of claim 8, wherein the behavioral data includes one or more threshold values having acceptable ranges of the at least one functional group.

14. A non-transitory computer readable storage medium having a program stored thereon, the program causing a system to execute the steps of:
   receiving at least one data stream for one or more first devices having an unknown device type connected to one or more local networks;
   creating at least one functional group from behavioral data of second devices having a known device type, wherein each of the second devices performs a same task as the other second devices in the functional group;

creating a behavior profile for the at least one functional group, wherein the behavior profile includes behavioral data describing statistical patterns of behaviors of the second devices, wherein the behavioral data describing statistical patterns of behaviors is obtained by user input, detection, and input from third parties;

determining behavioral data from the at least one data stream for the one or more first devices, wherein the behavioral data for the at least one data stream for the one or more first devices includes a time between the packet arrival and transmission and a duration of a connection;

determining a similarity between the behavioral data of the one or more first devices and the behavioral data of the behavior profile of the at least one functional group; and in response to determining that the similarity exceeds a predetermined or configurable threshold, assigning the known device type associated with the at least one functional group to the one or more first devices.

15. The non-transitory computer readable storage medium of claim 14, wherein the at least one data stream for the one or more first devices further includes one or more of: a statistical amount of inbound or outbound network traffic, a type of network traffic, a source and destination port of a packet, and a destination address of the packet.

16. The non-transitory computer readable storage medium of claim 14, wherein the at least one data stream for the one or more first devices is transmitted from one or more routers or monitor nodes to a behavior analyzer.

17. The non-transitory computer readable storage medium of claim 14, wherein the one or more routers or monitor nodes are coupled to an internet, and wherein the internet is coupled to the behavior analyzer.

18. The non-transitory computer readable storage medium of claim 14, wherein the behavior analyzer is coupled to a behavior database having known device behavior data.

19. The non-transitory computer readable storage medium of claim 14, wherein the behavioral data includes one or more threshold values having acceptable ranges of the at least one functional group.

* * * * *